United States Patent
Noguchi

(10) Patent No.: US 11,354,087 B2
(45) Date of Patent: Jun. 7, 2022

(54) VEHICLE

(71) Applicant: HONDA MOTOR CO., LTD., Tokyo (JP)

(72) Inventor: Kohei Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/184,831

(22) Filed: Feb. 25, 2021

(65) Prior Publication Data
US 2021/0303255 A1 Sep. 30, 2021

(30) Foreign Application Priority Data
Mar. 31, 2020 (JP) .............................. JP2020-061876

(51) Int. Cl.
| | |
|---|---|
| H04R 1/02 | (2006.01) |
| G06F 3/16 | (2006.01) |
| G08G 1/052 | (2006.01) |
| H04R 1/40 | (2006.01) |

(Continued)

(52) U.S. Cl.
CPC .............. *G06F 3/165* (2013.01); *B62J 3/10* (2020.02); *G08G 1/052* (2013.01); *H04R 1/025* (2013.01); *H04R 1/403* (2013.01); *H04R 3/12* (2013.01); *H04R 2430/01* (2013.01); *H04R 2499/13* (2013.01)

(58) Field of Classification Search
CPC .... H04R 1/403; H04R 2499/13; H04R 1/025; H04R 3/12; H04R 2430/01
USPC ..................... 381/86, 307, 302, 389
See application file for complete search history.

(56) References Cited

U.S. PATENT DOCUMENTS

| | | | | |
|---|---|---|---|---|
| 8,031,880 B2 * | 10/2011 | Holmi | .................... | H04S 7/307 |
| | | | | 381/103 |
| 8,073,156 B2 * | 12/2011 | Hutt | ....................... | H04R 1/403 |
| | | | | 381/86 |
| 9,743,213 B2 * | 8/2017 | Mohammad | ............ | H04R 5/04 |

(Continued)

FOREIGN PATENT DOCUMENTS

| | | |
|---|---|---|
| JP | 2007-116393 | 5/2007 |
| JP | 4743790 B2 | 8/2011 |

(Continued)

OTHER PUBLICATIONS

Japanese Office Action dated Oct. 26, 2021, English abstract included, 8 pages.
Indian Office Action dated Feb. 21, 2022, 6 pages.

*Primary Examiner* — Disler Paul
(74) *Attorney, Agent, or Firm* — Rankin, Hill & Clark LLP

(57) ABSTRACT

A vehicle includes a first voice output section, a second voice output section, a third voice output section, and a control section which are arranged side by side in a width direction of the vehicle. The control section controls volume of the voice output from the first, second and third voice output sections. If sitting on a rider seat and a pillion passenger seat is detected, the control section controls the first, second and third voice output sections to make the volume of the voice output from the first and third voice output sections larger than the volume of the voice output from the second voice output section. The first and third voice output sections are located at both ends in the width direction of the vehicle and the second voice output section is located between the first and third voice output sections.

7 Claims, 13 Drawing Sheets

(51) Int. Cl.
*B62J 3/10* (2020.01)
*H04R 3/12* (2006.01)

(56) References Cited

U.S. PATENT DOCUMENTS

| | | | |
|---|---|---|---|
| 11,265,669 B2* | 3/2022 | Cardinaux | G06T 7/74 |
| 2005/0259831 A1* | 11/2005 | Hutt | H04R 1/345 |
| | | | 381/86 |
| 2020/0404443 A1* | 12/2020 | Cardinaux | G06K 9/00832 |

FOREIGN PATENT DOCUMENTS

| | | |
|---|---|---|
| JP | 2012-231449 | 11/2012 |
| JP | 2019-139582 | 8/2019 |

* cited by examiner

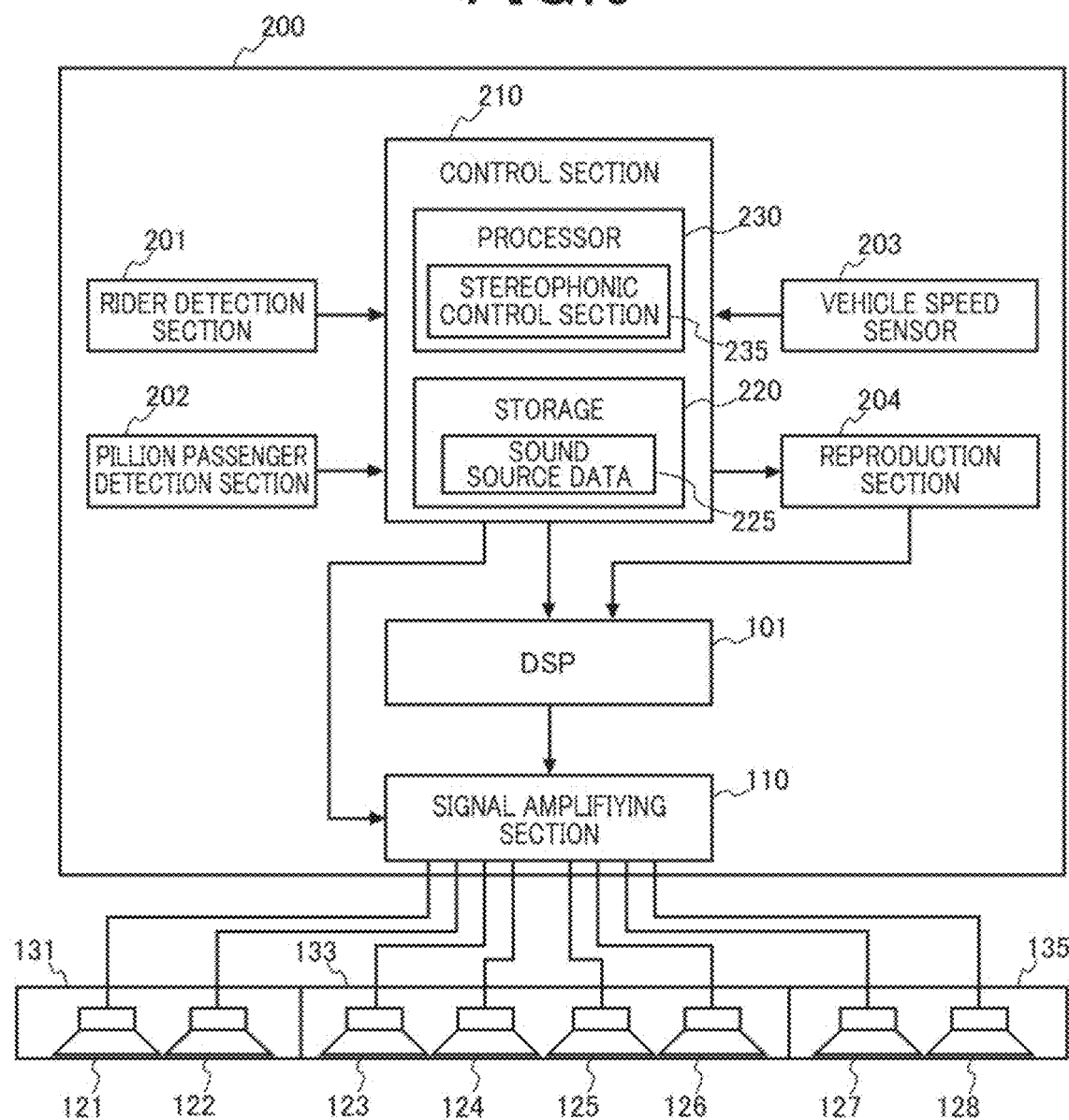

VEHICLE

INCORPORATION BY REFERENCE

The present application claims priority under 35 U.S.C. § 119 to Japanese Patent Application No. 2020-061876 filed on Mar. 31, 2020. The content of the application is incorporated herein by reference in its entirety.

TECHNICAL FIELD

The present invention relates to a vehicle.

BACKGROUND ART

In the past, a speaker has been mounted on a vehicle and an occupant of the vehicle can hear voice such as reproduced music or radio (for example, see Patent Literature 1).

CITATION LIST

Patent Literature

[Patent Literature 1] JP-A No. 2019-139582

SUMMARY OF INVENTION

Technical Problem

However, the volume of the voice which the rider of the vehicle can hear from a speaker may be different from the volume of the voice which a pillion passenger sitting behind the rider can hear from the speaker. For this reason, if the voice volume is set to the optimum level for the rider, the pillion passenger may be hardly able to hear the voice and if the voice volume is set to the optimum level for the pillion passenger, the rider may feel the voice large.

The present invention has been achieved in view of the abovementioned circumstances, and it is an object thereof to provide a vehicle in which voice output from a voice output section is controlled to the optimum volume for the rider and the pillion passenger on the vehicle.

Solution to Problem

In order to achieve the object, according to a first feature of the present invention, there is provided a vehicle which includes: a first voice output section (131), a second voice output section (133), a third voice output section (135), a first detection section (201), a second detection section (202), and a control section (210). The first voice output section (131), second voice output section (133), and third voice output section (135) are arranged side by side in the width direction of the vehicle (1). The first detection section (201) detects sitting of a rider on a rider seat (51) of the vehicle (1) and the second detection section (202) detects sitting of a pillion passenger on a pillion passenger seat (53) provided behind the rider seat (51) of the vehicle (1). The control section (210) controls the volume of voice according to a result of detection by the first detection section (201) and the second detection section (202). The voice is output from the first voice output section (131), the second voice output section (133), and the third voice output section (135). If the first detection section (201) and the second detection section (202) detect sitting on the rider seat (51) and the pillion passenger seat (53), the control section (210) controls the first voice output section (131), the second voice output section (133), and the third voice output section (135) to make the volume of the voice output from the first voice output section (131) and the third voice output section (135) larger than the volume of the voice output from the second voice output section (133). The first voice output section (131) and the third voice output section (135) are located at both ends in the width direction of the vehicle (1) and the second voice output section (133) is located between the first voice output section (131) and the third voice output section (135).

According to a second feature of the present invention, in addition to the first feature, if the first detection section (201) detects sitting on the rider seat (51) and the second detection section (202) does not detect sitting on the pillion passenger seat (53), the control section (210) may control the first voice output section (131), the second voice output section (133), and the third voice output section (135) to make the volume of the voice output from the first voice output section (131) and the third voice output section (135) smaller than the volume of the voice output from the second voice output section (133) or prevent the voice from being output from the first voice output section (131) and the third voice output section (135).

According to a third feature of the present invention, in addition to the first or second feature, if the second detection section (202) detects sitting on the pillion passenger seat (53) and the first detection section (201) does not detect sitting on the rider seat (51), the control section (210) may control the first voice output section (131), the second voice output section (133), and the third voice output section (135) to make the volume of the voice output from the second voice output section (133) smaller than the volume of the voice output from the first voice output section (131) and the third voice output section (135) or prevent the voice from being output from the second voice output section (133).

According to a fourth feature of the present invention, in addition to any one of the first to third features, a vehicle speed detection section (203) which detects a vehicle speed of the vehicle (1) may be provided and if the vehicle speed of the vehicle (1) is a set value or less, the control section (210) may control the first voice output section (131), the second voice output section (133), and the third voice output section (135) to make the volume of the voice output from the first voice output section (131) or the third voice output section (135) smaller than the volume of the voice output from other voice output sections or prevent the voice from being output from the first voice output section (131) or the third voice output section (135). The first voice output section (131) or the third voice output section (135) is located on an end side in a width direction of a road and nearer in distance to the end.

According to a fifth feature of the present invention, in addition to anyone of the first to fourth features, the first voice output section (131) and the third voice output section (135) may be located outside of the vehicle width in the width direction of the vehicle (1).

According to a sixth feature of the present invention, in addition to any one of the first to fifth features, the first voice output section (131) and the third voice output section (135) may be located inside of positions of mirrors (55, 57) installed on the vehicle (1) in the width direction of the vehicle (1).

According to a seventh feature of the present invention, in addition to any one of the first to sixth features, the first voice output section (131) and the third voice output section (135) may include a plurality of speakers.

Advantageous Effects of Invention

With the first feature, the vehicle includes the first voice output section, second voice output section, third voice output section, first detection section, second detection section, and control section. The first voice output section, second voice output section, and third voice output section are arranged side by side in the width direction of the vehicle. The first detection section detects sitting of the rider on the rider seat of the vehicle and the second detection section detects sitting of the pillion passenger on the pillion passenger seat provided behind the rider seat. The control section controls the volume of voice according to the result of detection by the first detection section and the second detection section. The voice is output from the first voice output section, second voice output section, and third voice output section. If the first detection section and the second detection section detect sitting on the rider seat and the pillion passenger seat, the control section controls the first voice output section, the second voice output section, and the third voice output section to make the volume of the voice output from the first voice output section and the third voice output section larger than the volume of the voice output from the second voice output section. The first voice output section and the third voice output section are located at both ends in the width direction of the vehicle and the second voice output section is located between the first voice output section and the third voice output section.

According to this feature, if sitting on the rider seat and the pillion passenger seat is detected, the volume of the voice output from the first voice output section and third voice output section is controlled to be larger than the volume of the voice output from the second voice output section and thus an adjustment can be made so that the volume of the voice heard by the rider and that by the pillion passenger behind the rider are almost the same.

With the second feature, if the first detection section detects sitting on the rider seat and the second detection section does not detect sitting on the pillion passenger seat, the control section controls the first voice output section, the second voice output section, and the third voice output section to make the volume of the voice output from the first voice output section and the third voice output section smaller than the volume of the voice output from the second voice output section or prevent the voice from being output from the first voice output section and the third voice output section.

According to this feature, power consumption can be reduced and the rider can hear the voice with a sufficient volume.

With the third feature, if the second detection section detects sitting on the pillion passenger seat and the first detection section does not detect sitting on the rider seat, the control section controls the first voice output section, the second voice output section, and the third voice output section to make the volume of the voice output from the second voice output section smaller than the volume of the voice output from the first voice output section and the third voice output section or prevent the voice from being output from the second voice output section.

According to this feature, power consumption can be reduced and the pillion passenger can hear the voice with a sufficient volume.

With the fourth feature, the vehicle speed detection section which detects the vehicle speed of the vehicle is provided and if the vehicle speed of the vehicle is the set value or less, the control section controls the first voice output section, the second voice output section, and the third voice output section to make the volume of the voice output from the first voice output section or the third voice output section smaller than the volume of the voice output from other voice output sections or prevent the voice from being output from the first voice output section or the third voice output section. The first voice output section or the third voice output section is located on the end side in the width direction of the road and nearer in distance to the end.

According to this feature, the voice output from the first voice output section or third voice output section can be prevented from being heard by a pedestrian.

With the fifth feature, the first voice output section and the third voice output section are located outside of the vehicle width in the width direction of the vehicle.

According to this feature, the voice which reaches the pillion passenger can be larger.

With the sixth feature, the first voice output section and the third voice output section are located inside of the positions of the mirrors installed on the vehicle in the width direction of the vehicle.

According to this feature, it is possible to suppress the increase in the size of the vehicle in the vehicle width direction due to the presence of the first voice output section, second voice output section, and third voice output section.

With the seventh feature, the first voice output section and the third voice output section include a plurality of speakers.

According to this feature, the pillion passenger can hear the voice with a sufficient volume.

BRIEF DESCRIPTION OF DRAWINGS

FIG. 6 is a block diagrams which shows the configuration of an onboard device.

DESCRIPTION OF EMBODIMENTS

Next, Embodiment of the present invention will be described referring to drawings. In the description below, direction-related words such as front, back, left, right, and up and down are the same as those with respect to the vehicle body unless otherwise specified. In each drawing, sign FR represents forward of the vehicle body, sign UP represents upward of the vehicle body, sign LH represents left of the vehicle body, and sign RH represents right of the vehicle body.

Figure 1:
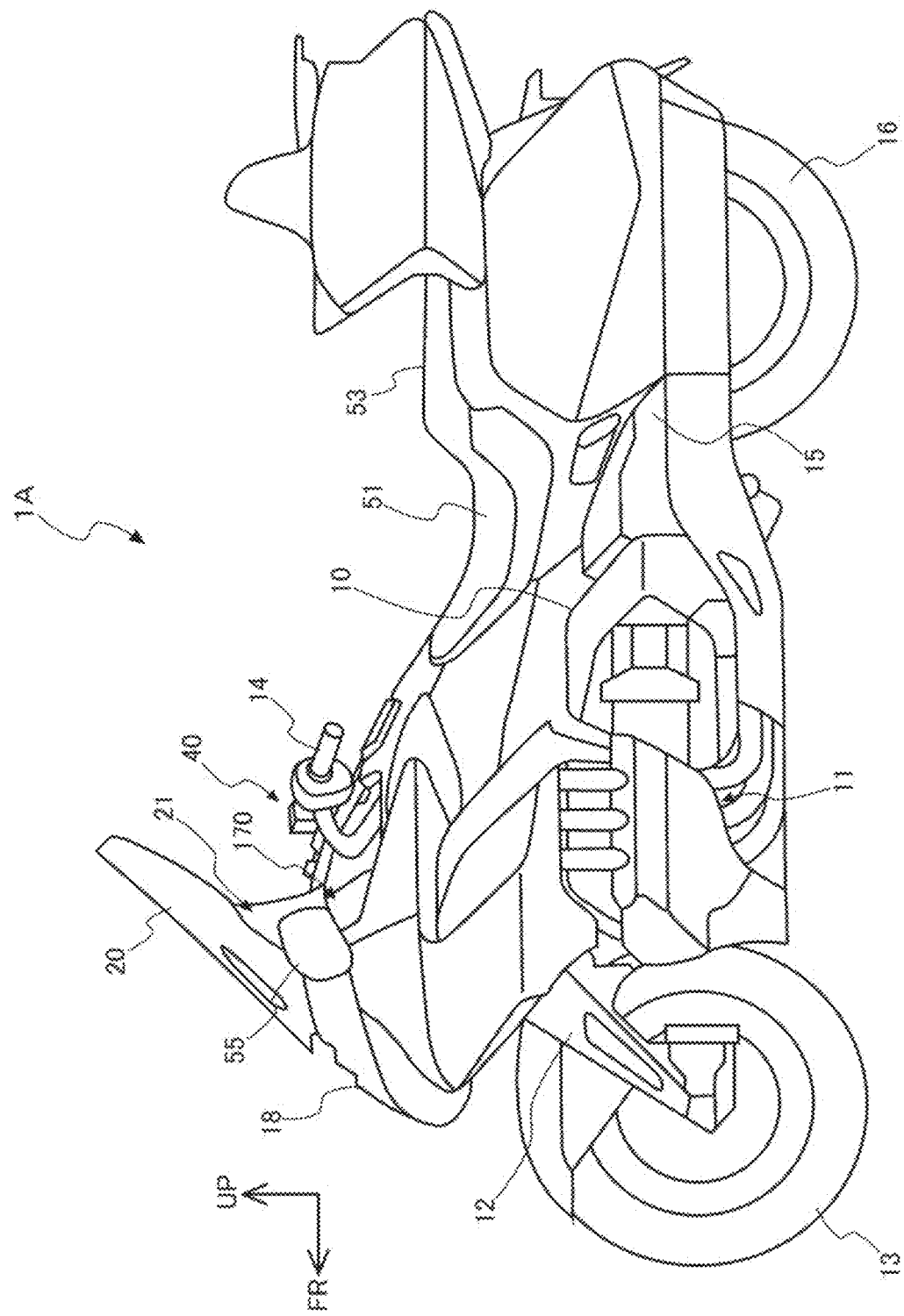
FIG. 1 is a side view of a motorcycle.
Figure 2:
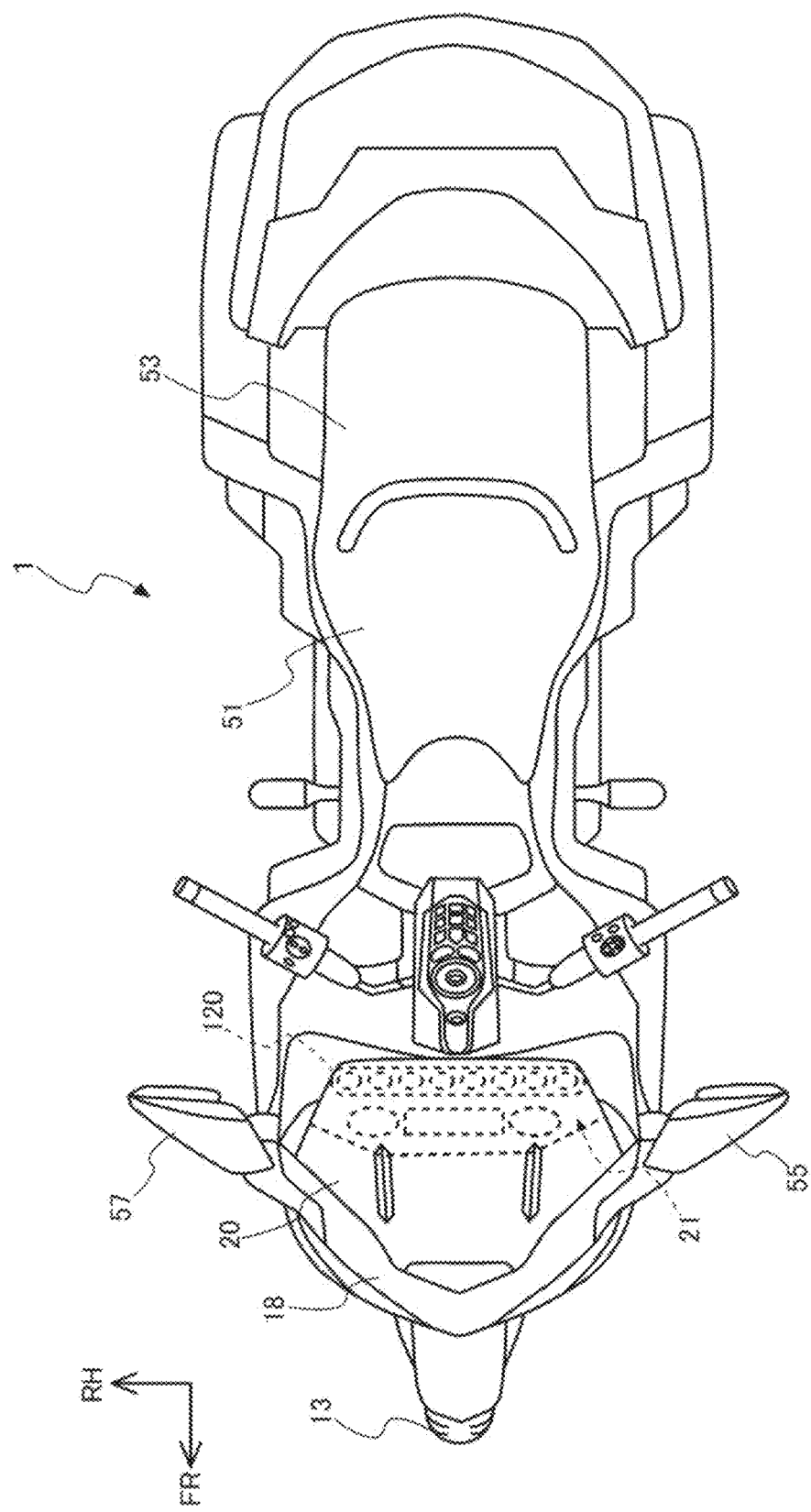
FIG. 2 is a top view of the motorcycle.
Figure 3:
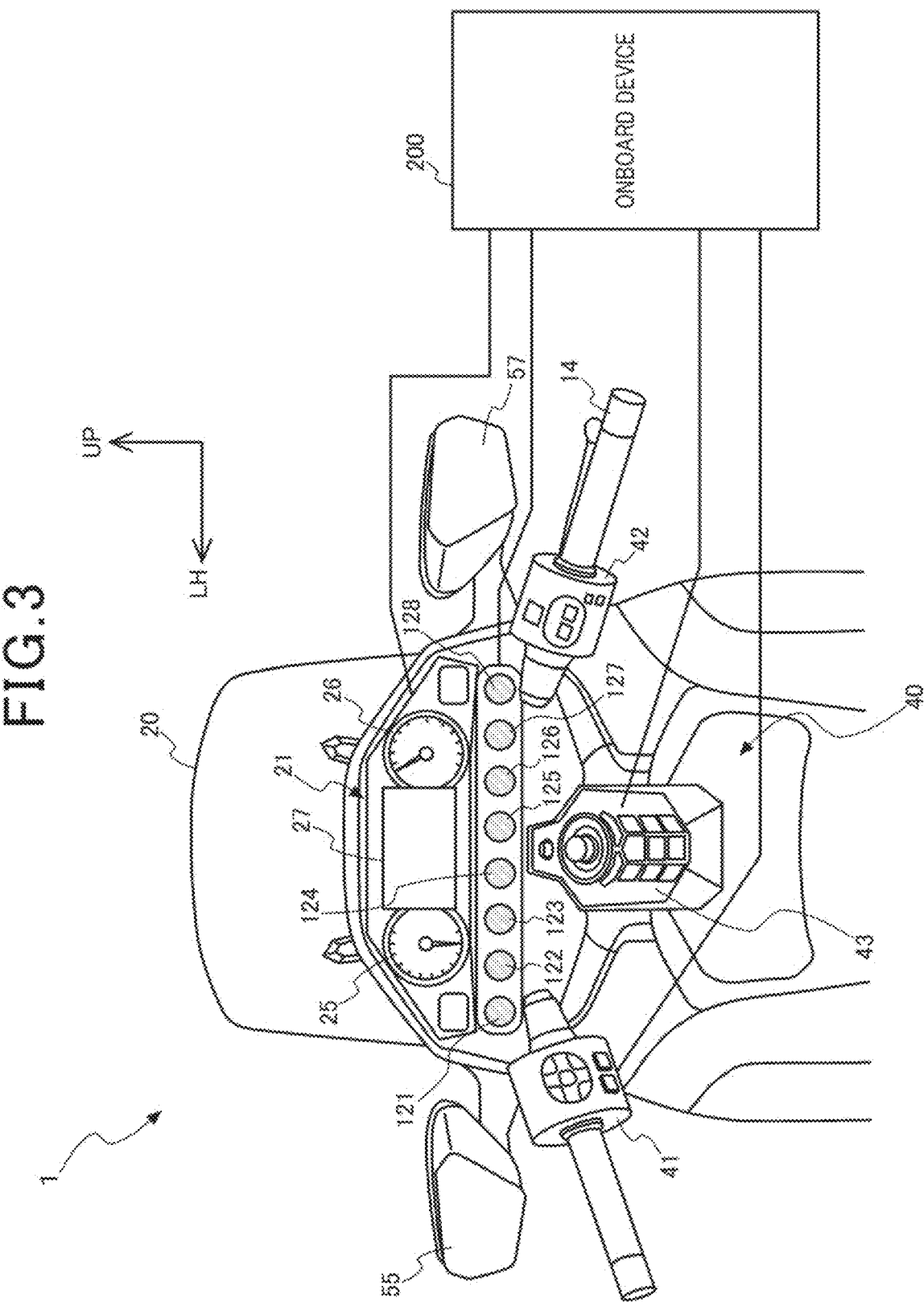
FIG. 3 is a view of the motorcycle as viewed forward from the rear.

FIG. 1 is a side view of a motorcycle according to an embodiment of the present invention; FIG. 2 is a top view of the motorcycle; and FIG. 3 is a view of the motorcycle as viewed forward from the rear. As shown in FIG. 1, the vehicle 1 as a motorcycle includes a body frame 10 and a power unit 11 which is supported by the body frame 10. In the front portion of the body frame 10, a front wheel 13 is transversely steerably supported through a front fork 12 which also functions as a front cushion and a steering handlebar 14 is provided at the top of the front fork 12. In the rear lower portion of the body frame 10, a rear wheel 16 is vertically swingably supported through a swing arm 15 and a pillion passenger seat 53 is interposed between the body frame 10 and the swing arm 15. The power unit 11 includes an engine and a transmission mechanism and rotatively drives the rear wheel 16 through a shaft drive mechanism.

As shown in FIG. 2, behind the steering handlebar 14, the body frame 10 supports a rider seat 51 for a rider U1 (see FIG. 10) to sit on and the pillion passenger seat 53 for a pillion passenger U2 (see FIG. 10) to sit on and also supports a body cover 18 covering almost the whole body frame 10. A front screen 20 or the like which covers an area in front of an occupant is attached to the body cover 18. A meter panel 21 and a speaker array 120 are arranged between the front screen 20 and the steering handlebar 14, in which the meter panel 21 shows various types of information and the speaker array 120 functions as a speaker unit. A manipulation portion 40 for menu selection or the like in the meter panel 21 is located around the steering handlebar 14. Also, a left mirror 55 and a right mirror 57 are located on the body cover 18. The left mirror 55 and right mirror 57 are located outside of the front screen 20 in the vehicle width direction of the vehicle 1.

In the vehicle 1, an onboard device 200 which is electrically connected with the meter panel 21, speaker array 120, and manipulation portion 40 is mounted. The onboard device 200 controls the display content of the meter panel 21 and the output voice from the speaker array 120 and also receives various instructions from the rider U1 through the manipulation portion 40.

FIG. 3 is a view which shows the area around the meter panel 21 as viewed from the rider U1, together with the onboard device 200. The meter panel 21 includes measuring instruments 25 and 26 and a display 27, in which the measuring instruments 25 and 26 show information related to the motorcycle (speed, engine speed, etc.) and the display 27 shows various types of information. The display 27 includes a known display panel such as a liquid crystal panel and displays various types of information for the rider U1 or the like, under the control of the onboard device 200.

The speaker array 120 is a speaker unit which includes a plurality of speakers 130 (see FIG. 4) arranged side by side in the width direction of the vehicle 1 and broadens the audible area for the rider U1 or the like in the widthwise direction. The structure is as follows: from left as viewed from the rider U1, a first speaker 121, a second speaker 122, a third speaker 123, a fourth speaker 124, a fifth speaker 125, a sixth speaker 126, a seventh speaker 127, and an eighth speaker 128 are arranged in a row. Hereinafter, the first speaker 121, second speaker 122, third speaker 123, fourth speaker 124, fifth speaker 125, sixth speaker 126, seventh speaker 127, and eighth speaker 128 are collectively called the speakers 130.

Figure 4:
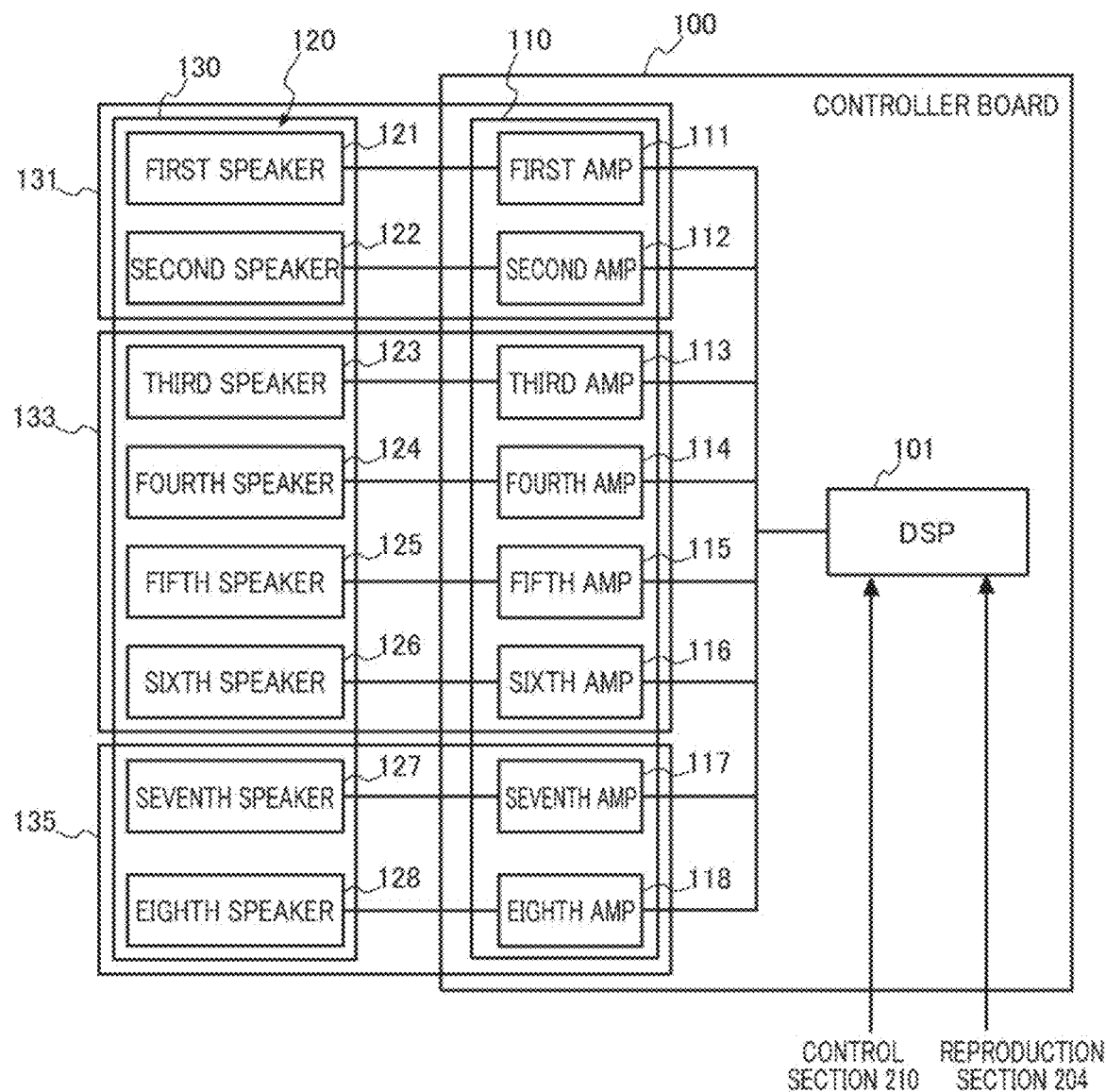
FIG. 4 is a diagram which shows the configuration of the voice output system.

The first speaker 121 and second speaker 122 constitute a first voice output section 131 which is located on the left as viewed from the rider U1 (see FIG. 4). The third speaker 123, fourth speaker 124, fifth speaker 125, and sixth speaker 126 constitute a second voice output section 133 which is located in the center in the vehicle width direction (see FIG. 4). The seventh speaker 127 and eighth speaker 128 constitute a third voice output section 135 which is located on a right side as viewed from the rider U1 (see FIG. 4). The numbers of speakers 130 which constitute the first voice output section 131, the second voice output section, and the third voice output section 135 are arbitrary and can be changed as appropriate.

Due to this structure, even when the heads of the rider U1 and pillion passenger U2 move left or right or the like, the voice from any one of the first voice output section 131, second voice output section 133, and third voice output section 135 can be transmitted to the ears of the rider U1 and pillion passenger U2.

In the speakers 130 arranged in a row, the first speaker 121 installed at the left end is located outside of the width of the vehicle 1 in the vehicle width direction and the eighth speaker 128 installed at the right end is located outside of the width of the vehicle 1 in the vehicle width direction. Specifically, the width of the vehicle 1 is the width of the rider seat 51 and the first speaker 121 and eighth speaker 128 are located more outward in the vehicle width direction than the ends of the rider seat 51 in the vehicle width direction.

Also, the first speaker 121 installed at the left end is located inside of the left mirror 55 in the vehicle width direction and the eighth speaker 128 installed at the right end is located inside of the right mirror 57 in the vehicle width direction.

In addition, in the vehicle 1, the manipulation portion 40 includes left and right handlebar manipulation portions 41 and 42 and a center manipulation portion 43. The left and right handlebar manipulation portions 41 and 42 are located left and right on the steering handlebar 14 respectively and the center manipulation portion 43 is located between the speaker array 120 and seat 17 and in the center position in the vehicle width direction. These manipulation portions 40 include not only a group of switches constituting a general manipulation system to manipulate a light device such as a blinker of the vehicle 1 and turn ON/OFF the power unit 11, but also a group of switches constituting a manipulation system related to the display 27 of the meter panel 21 and the speaker array 120.

FIG. 4 is a diagram which shows the configuration of a voice output system. The voice output system is mounted on a controller board 100.

A DSP 101 and a signal amplifying section 110 are mounted on the controller board 100. DSP is an abbreviation for Digital Signal Processor.

The DSP 101 receives an audio signal reproduced by a reproduction section 204 (circuit) (see FIG. 6). The DSP 101 generates an analog signal in a plurality of channels according to the received audio signal. The DSP 101 outputs the generated analog signal to the signal amplifying section 110.

The signal amplifying section 110 includes a first AMP 111, a second AMP 112, a third AMP 113, a fourth AMP 114, a fifth AMP 115, a sixth AMP 116, a seventh AMP 117, and an eighth AMP 118. AMP is an abbreviation for Amplifier.

The first AMP 111 is connected with the first speaker 121. The second AMP 112 is connected with the second speaker 122. The first AMP 111 amplifies the received analog signal and outputs it to the first speaker 121. The second AMP 112 amplifies the received analog signal and outputs it to the second speaker 122.

The first AMP 111, first speaker 121, second AMP 112 and second speaker 122 constitute the first voice output section 131.

The third AMP 113 is connected with the third speaker 123. The fourth AMP 114 is connected with the fourth speaker 124. The fifth AMP 115 is connected with the fifth speaker 125. The sixth AMP 116 is connected with the sixth speaker 126.

The third AMP 113 amplifies the received analog signal and outputs it to the third speaker 123. The fourth AMP 114 amplifies the received analog signal and outputs it to the fourth speaker 124. The fifth AMP 115 amplifies the received analog signal and outputs it to the fifth speaker 125. The sixth AMP 116 amplifies the received analog signal and outputs it to the sixth speaker 126.

The third AMP 113, third speaker 123, fourth AMP 114, fourth speaker 124, fifth AMP 115, fifth speaker 125, sixth AMP 116, and sixth speaker 126 constitute the second voice output section 133.

The seventh AMP 117 is connected with the seventh speaker 127. The eighth AMP 118 is connected with the eighth speaker 128. The seventh AMP 117 amplifies the received analog signal and outputs it to the seventh speaker 127. The eighth AMP 118 amplifies the received analog signal and outputs it to the eighth speaker 128.

The seventh AMP 117, seventh speaker 127, eighth AMP 118, and eighth speaker 128 constitute the third voice output section 135.

Figure 5A:
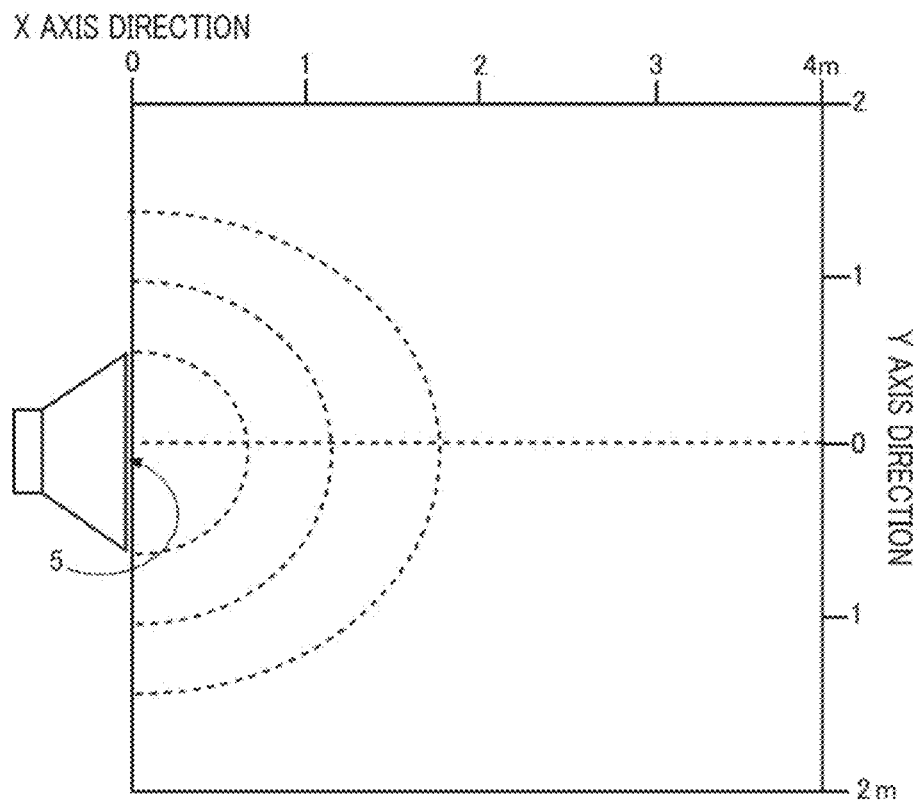
FIG. 5A and FIG. 5B are explanatory diagrams which explain the directivity of a speaker.
Figure 5B:
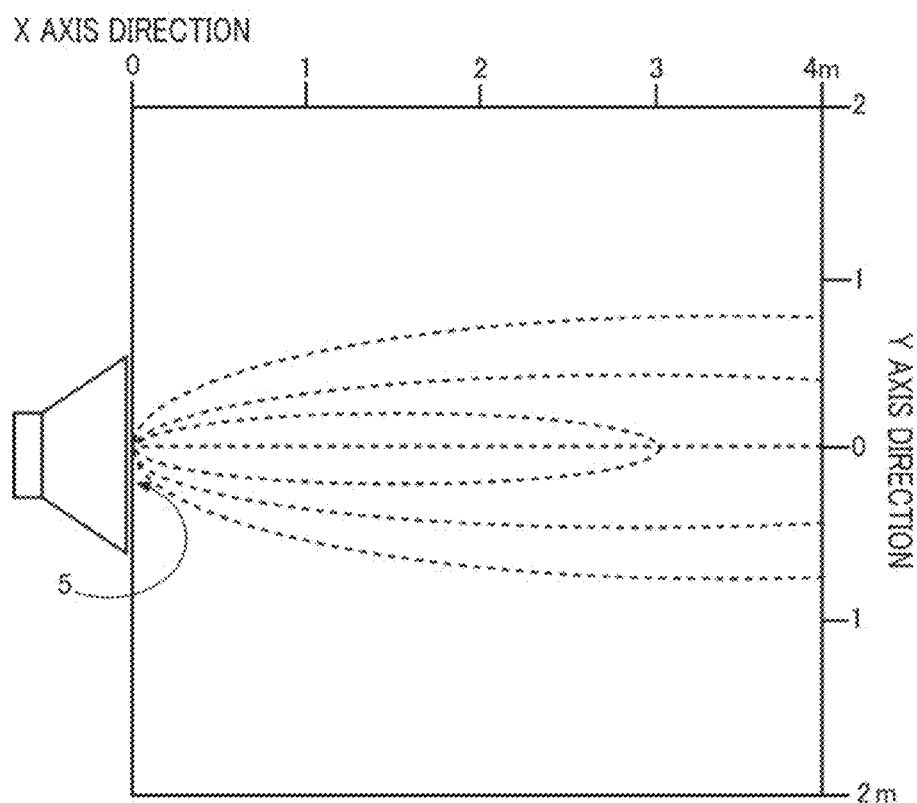

Here, the directivity of the speakers 130 is described referring to FIG. 5A and FIG. 5B.

A speaker 130 mounted on the vehicle 1 has super-directivity and the voice output from the speaker 130 is high in straightness and sharp in directivity.

FIG. 5A shows the range of transmission of the voice output from a commonly used speaker and FIG. 5B shows the range of transmission of the voice output from the speaker 130 with super-directivity. The horizontal axis in FIG. 5A and FIG. 5B represents distance in the X axis direction and the vertical axis represents distance in the Y axis direction. The X axis direction is a direction perpendicular to a voice output plane 5 of the speaker 130 and the Y axis direction is a direction parallel to the voice output plane 5. The origin in the Y axis direction is set at the center in the Y axis direction of the voice output plane 5 of the speaker 130. As apparent from comparison between FIG. 5A and FIG. 5B, it is known that with the speaker 130 mounted on the vehicle 1, the range of transmission in the horizontal direction (transverse direction) is narrow but the voice is far-reaching.

FIG. 6 is a block diagram which shows the configuration of the onboard device 200.

The configuration of the onboard device 200 is described below referring to FIG. 6.

The onboard device 200 includes a rider detection section 201, a pillion passenger detection section 202, a vehicle speed sensor 203, a reproduction section 204, a DSP 101, and a signal amplifying section 110, and a control section 210 connected to these devices. The rider detection section 201 corresponds to a first detection section and the pillion passenger detection section 202 corresponds to a second detection section.

The rider detection section 201 includes a commonly known sitting sensor and detects that the rider U1 is sitting on the rider seat 51. As the rider detection section 201 detects that the rider U1 is sitting on the rider seat 51, it outputs sensor data indicating the detection of sitting, to the control section 210.

The pillion passenger detection section 202 includes a commonly known sitting sensor and detects that the pillion passenger U2 is sitting on the pillion passenger seat 53. The pillion passenger seat 53 is located behind the rider seat 51 as shown in FIG. 2. As the pillion passenger detection section 202 detects that the pillion passenger U2 is sitting on the pillion passenger seat 53, it outputs sensor data indicating the detection of sitting, to the control section 210.

The vehicle speed sensor 203 is a sensor which detects the vehicle speed of the vehicle 1. The vehicle speed sensor 203 detects the vehicle speed of the vehicle 1 and outputs sensor data indicating the detected vehicle speed, to the control section 210.

The reproduction section 204 reads and reproduces sound source data 225 stored in a storage 220, such as music, and outputs an audio signal to the DSP 101.

The control section 210 is a computer device which includes a storage 220 and a processor 230. The storage 220 includes memories such as a ROM and RAM. The storage 220 stores the computer program to be executed by the processor 230. The storage 220 also stores the data processed at the time of execution of the computer program by the processor 230, and the processing result data. In addition, the storage 220 stores the sound source data 225 reproduced by the reproduction section 204.

The processor 230 includes a CPU, a microcomputer, a DSP and so on and controls various parts of the control section 210 by executing a program. The processor 230 may be an SoC which integrates the processor 230 and storage 220. DSP is an abbreviation for Digital Signal Processor. SoC is an abbreviation for System-on-a-chip.

The control section 210 implements various functional elements by the processor 230 executing the computer program stored in the storage 220. The control section 210 in this embodiment includes, as a functional element, a stereophonic control section 235.

The stereophonic control section 235 receives sensor data from the rider detection section 201, the pillion passenger detection section 202, and the vehicle speed sensor 203. The stereophonic control section 235 controls the DSP 101 and the signal amplifying section 110 according to the received sensor data and controls the speakers 130 which output voice and the volume of the voice output from the speakers 130.

Figure 7:
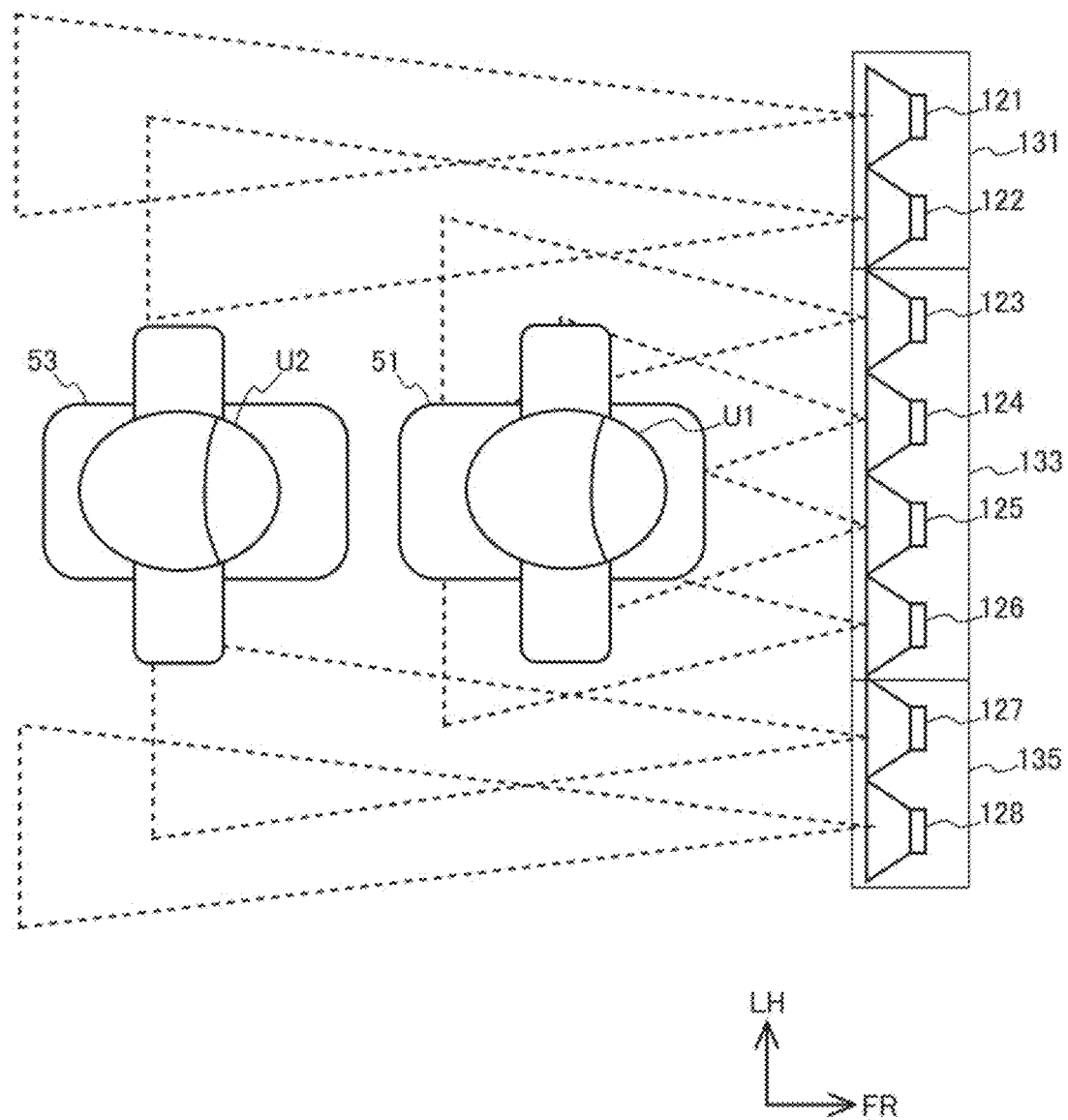
FIG. 7 is a diagram which shows the volume of the voice output from the first to third voice output sections.

FIG. 7 to FIG. 10 are diagrams which show the volume of the voice which is output from the first voice output section 131, second voice output section 133, and third voice output section 135. Particularly, FIG. 7 is a diagram which shows the volume of the voice which is output from the first voice output section 131 to the third voice output section 135 when the rider U1 is sitting on the rider seat 51 and the pillion passenger U2 is sitting on the pillion passenger seat 53.

First, the stereophonic control section 235 determines whether or not the rider U1 is sitting on the rider seat 51 and the pillion passenger U2 is sitting on the pillion passenger seat 53, according to the sensor data received from the rider detection section 201 and pillion passenger detection section 202.

When the rider U1 is sitting on the rider seat 51 and the pillion passenger U2 is sitting on the pillion passenger seat 53, the stereophonic control section 235 controls the first voice output section 131, second voice output section 133, and third voice output section 135 as follows. The stereophonic control section 235 controls the signal amplifying section 110 so that the volume of the voice output from the first voice output section 131 and third voice output section 135 is larger than the volume of the voice output from the second voice output section 133.

In this case, the volume of the voice output from the first speaker 121 of the first voice output section 131 and that from the second speaker 122 of the first voice output section 131 may be the same or the volume of the voice output from the first speaker 121, located outward in the vehicle width direction, may be larger than the volume of the voice output from the second speaker 122, located inward in the vehicle width direction.

Similarly, the volume of the voice output from the seventh speaker 127 of the third voice output section 135 and that from the eighth speaker 128 of the third voice output section 135 may be the same or the volume of the voice output from the eighth speaker 128, located outward in the vehicle width direction, may be larger than the volume of the voice output from the seventh speaker 127, located inward in the vehicle width direction.

When the rider U1 and the pillion passenger U2 are sitting on the vehicle 1, the voice output from the second voice output section 133, located in the center in the vehicle width direction, is interrupted by the rider U1 and attenuated and the volume of the voice audible for the pillion passenger U2 is lowered. Therefore, if the first voice output section 131 to the third voice output section 135 are the same in output, the volume of the voice audible for the pillion passenger U2 is smaller than the volume of the voice audible for the rider U1.

Therefore, when the rider U1 and the pillion passenger U2 are sitting on the vehicle 1, the stereophonic control section 235 controls the first voice output section 131 to the third voice output section 135 so that the volume of the voice output from the first voice output section 131 and third voice output section 135 is larger than the volume of the voice output from the second voice output section 133.

Figure 8:
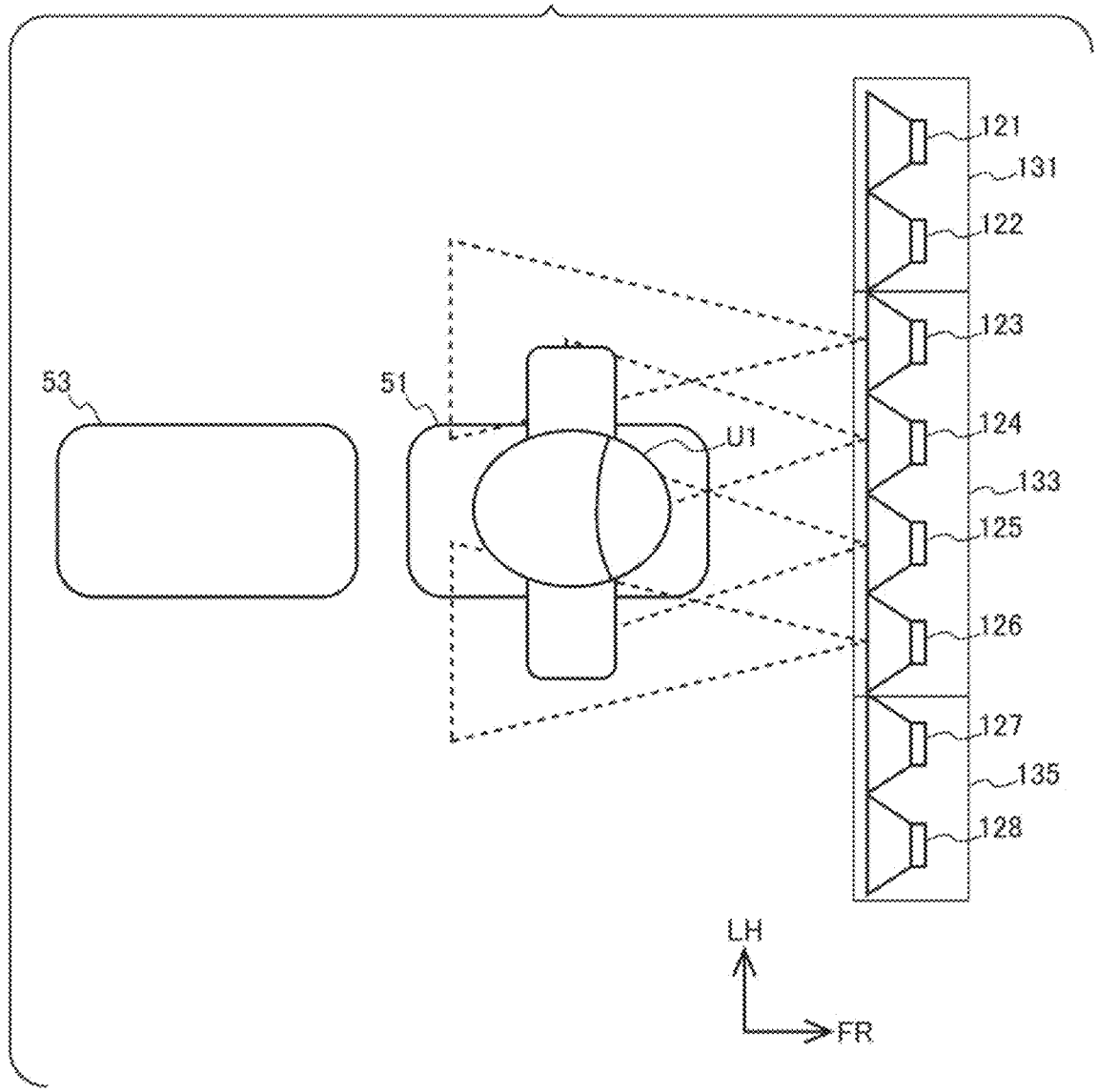
FIG. 8 is a diagram which shows the volume of the voice output from the first to third voice output sections.

FIG. 8 is a diagram which shows the volume of the voice which is output from the first voice output section 131 to the third voice output section 135 when the rider U1 is sitting on the rider seat 51 and the pillion passenger U2 is not sitting on the pillion passenger seat 53.

When the rider U1 is sitting on the rider seat 51 and the pillion passenger U2 is not sitting on the pillion passenger seat 53, the stereophonic control section 235 controls the first voice output section 131, second voice output section 133, and third voice output section 135 as follows. The stereophonic control section 235 controls the DSP 101 so that the first voice output section 131 and third voice output section 135 do not output voice. Alternatively, the stereophonic control section 235 controls the signal amplifying section 110 so that the volume of the voice output from the first voice output section 131 and third voice output section 135 is smaller than the volume of the voice output from the second voice output section 133.

In this embodiment, the speakers 130 have super-directivity and the output voice has high straightness. For this reason, in order to enable the rider U1 to hear the voice, the stereophonic control section 235 controls the DSP 101 so that the voice is not output from the first voice output section 131 and third voice output section 135 which are located outward in the vehicle width direction and low in contribution ratio. Alternatively, the stereophonic control section 235 controls the signal amplifying section 110 so that the volume of the voice output from the first voice output section 131 and third voice output section 135 is smaller than the volume of the voice output from the second voice output section 133.

The power consumption of the onboard device 200 can be reduced by controlling the DSP 101 to prevent the voice from being output from the first voice output section 131 and third voice output section 135 or by making the voice output from the first voice output section 131 and third voice output section 135 smaller than the voice output from the second voice output section 133.

Figure 9:
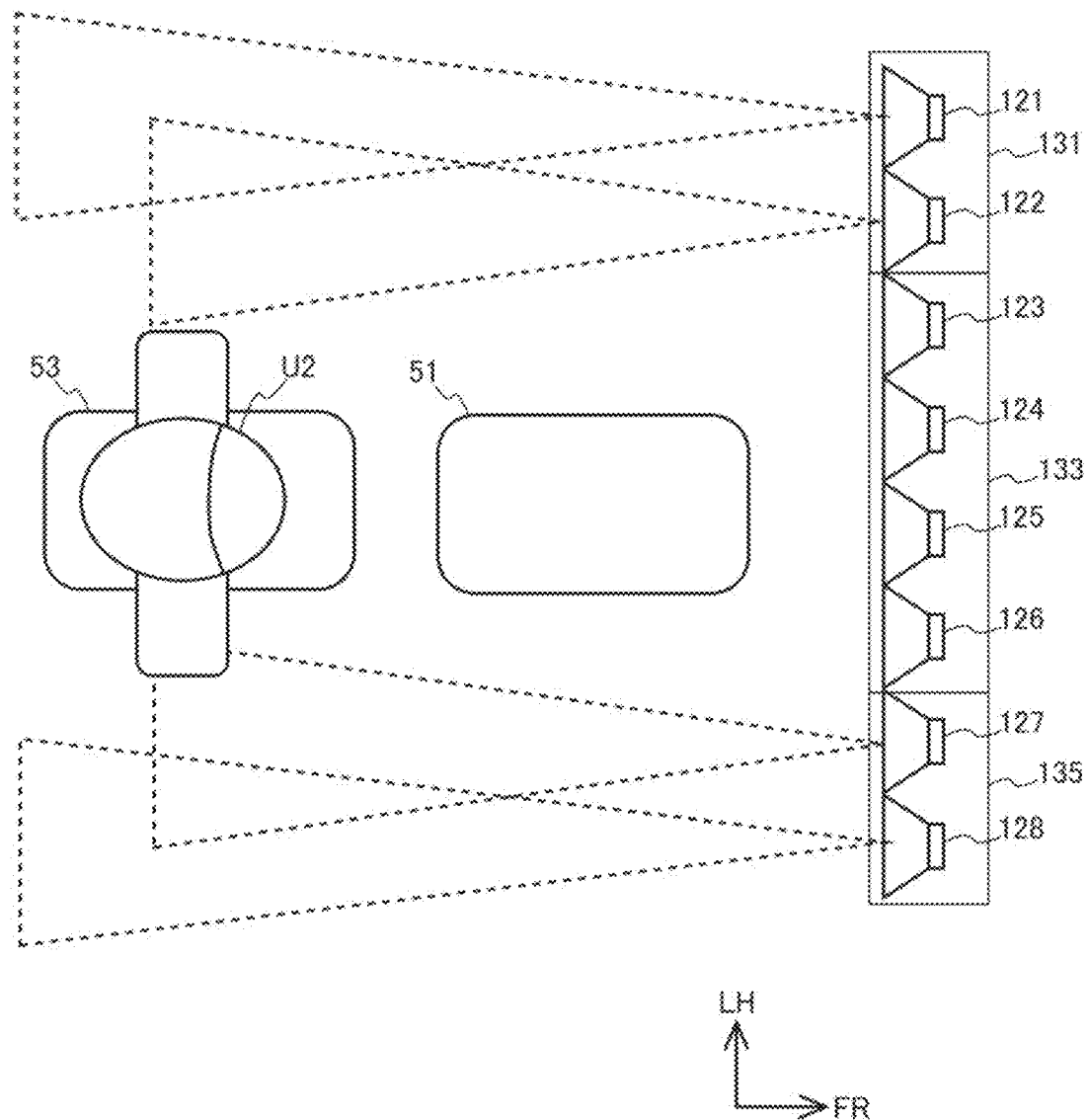
FIG. 9 is a diagram which shows the volume of the voice output from the first to third voice output sections.

FIG. 9 is a diagram which shows the volume of the voice which is output from the first voice output section 131 to the third voice output section 135 when the rider U1 is not sitting on the rider seat 51 and the pillion passenger U2 is sitting on the pillion passenger seat 53.

When the rider U1 is not sitting on the rider seat 51 and the pillion passenger U2 is sitting on the pillion passenger seat 53, the stereophonic control section 235 controls the first voice output section 131, second voice output section 133, and third voice output section 135 as follows.

The stereophonic control section 235 controls the DSP 101 to prevent the voice from being output from the second voice output section 133. Alternatively, the stereophonic control section 235 controls the signal amplifying section 110 so that the volume of the voice output from the second voice output section 133 is smaller than the volume of the voice output from the first voice output section 131 and third voice output section 135.

The power consumption of the onboard device 200 can be reduced by controlling to prevent the voice from being output from the second voice output section 133 or by making the voice output from the second voice output section 133 smaller than the voice output from the first voice output section 131 and third voice output section 135.

Figure 10:
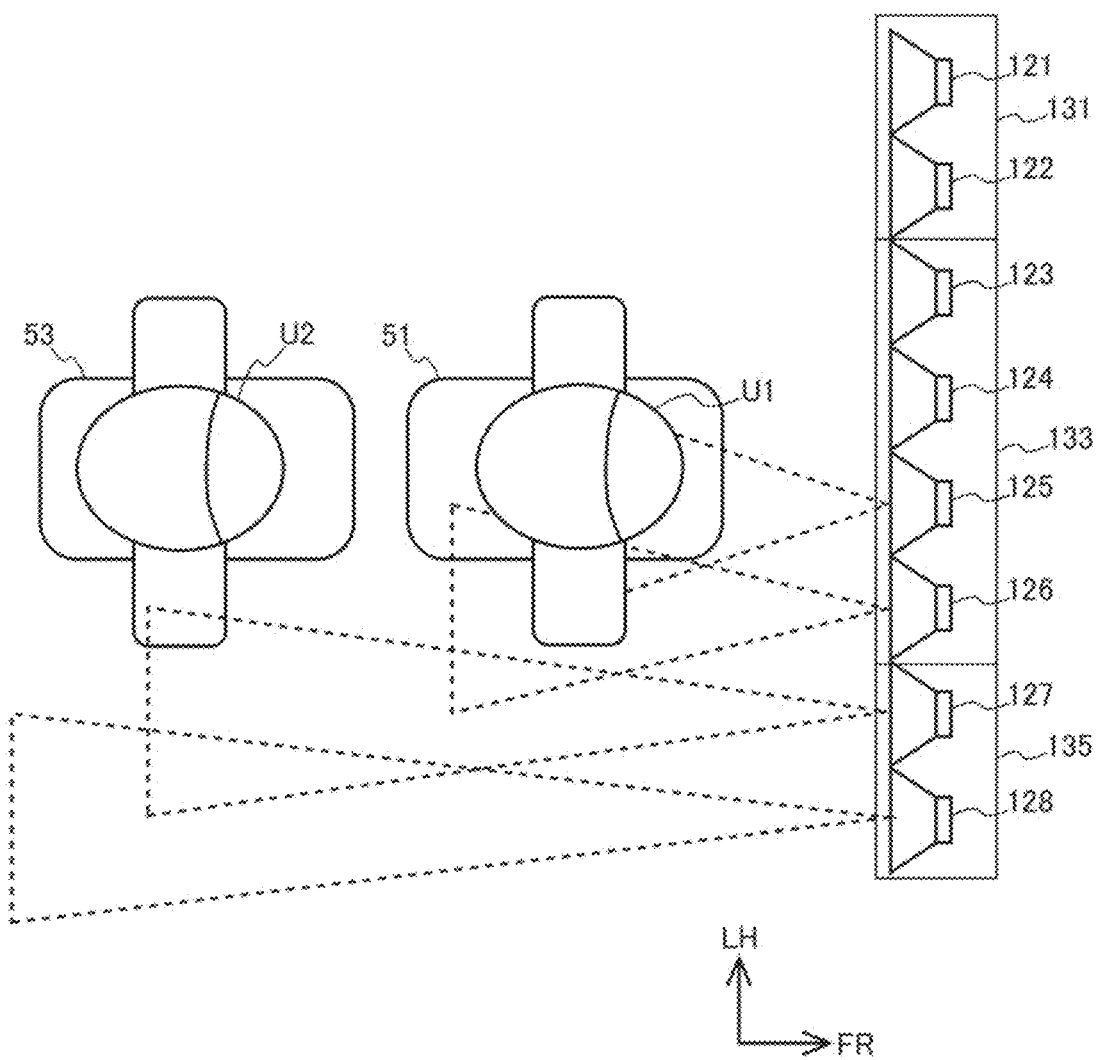
FIG. 10 is a diagram which shows the volume of the voice output from the first to third voice output sections.

FIG. 10 is a diagram which shows the volume of the voice which is output from the first voice output section 131 to the third voice output section 135 when the vehicle 1 is stopped with the rider U1 sitting on the rider seat 51 and the pillion passenger U2 sitting on the pillion passenger seat 53.

When the vehicle 1 is stopped to wait for the traffic light to change or the like, the stereophonic control section 235 controls the first voice output section 131, second voice output section 133, and third voice output section 135 as follows.

The stereophonic control section 235 controls the DSP 101 to prevent the voice from being output from the first voice output section 131. In other words, the stereophonic control section 235 mutes the output of the first voice output section 131 located on the left side in the vehicle width direction of the vehicle 1. Alternatively, the stereophonic control section 235 may make the volume of the voice output from the first voice output section 131 smaller than the volume of the voice output from the second voice output section 133 and third voice output section 135.

With the vehicle 1 stopped, the voice output from the speakers 130 may reach a pedestrian walking on a pathway or at an end of the road and annoy the pedestrian. Therefore, the stereophonic control section 235 mutes the output of the first voice output section 131 which is located on an end side in the width direction of the road and on the left side nearer in distance to the end. Alternatively, the stereophonic control section 235 controls the signal amplifying section 110 so that the volume of the voice output from the first voice output section 131 is smaller than the volume of the voice output from the second voice output section 133 and third voice output section 135. In Japan, the vehicle 1 must travel on the left-hand side of the road, so the output of the first voice output section 131 located on the left side of the vehicle 1 is muted. In another case, if the vehicle 1 travels on the right-hand side, the stereophonic control section 235 mutes the output of the third voice output section 135 located on the right side of the vehicle 1. Alternatively, the signal amplifying section 110 may be controlled so that the volume of the voice output from the third voice output section 135 is smaller than the volume of the voice output from the first voice output section 131 and second voice output section 133.

Furthermore, the stereophonic control section 235 may mute not only the output of the first voice output section 131 but also the output of the third speaker 123 and fourth speaker 124 of the second voice output section 133. Since the third speaker 123 and fourth speaker 124 are also located on the left side in the vehicle width direction of the vehicle 1, the effectiveness can be increased by muting the output of the third speaker 123 and fourth speaker 124. Also, the stereophonic control section 235 may control the signal amplifying section 110 so that the volume of the voice output by the first speaker 121 to the fourth speaker 124 is smaller than the volume of the voice output by the fifth speaker 125 to the eighth speaker 128.

Similarly, when the vehicle 1 travels on the right-hand side, the stereophonic control section 235 may mute not only the output of the third voice output section 135 but also the output of the fifth speaker 125 and sixth speaker 126 of the second voice output section 133. Also, the stereophonic control section 235 may make the volume of the voice output from the first voice output section 131 and the fourth speaker 124 and fifth speaker 125 of the second voice output section 133 smaller than the volume of the voice output from other speakers 130. The other speakers 130 are the fifth speaker 125 and sixth speaker 126 of the second voice output section 133 and the seventh speaker 127 and eighth speaker 128 of the third voice output section 135.

Figure 11:
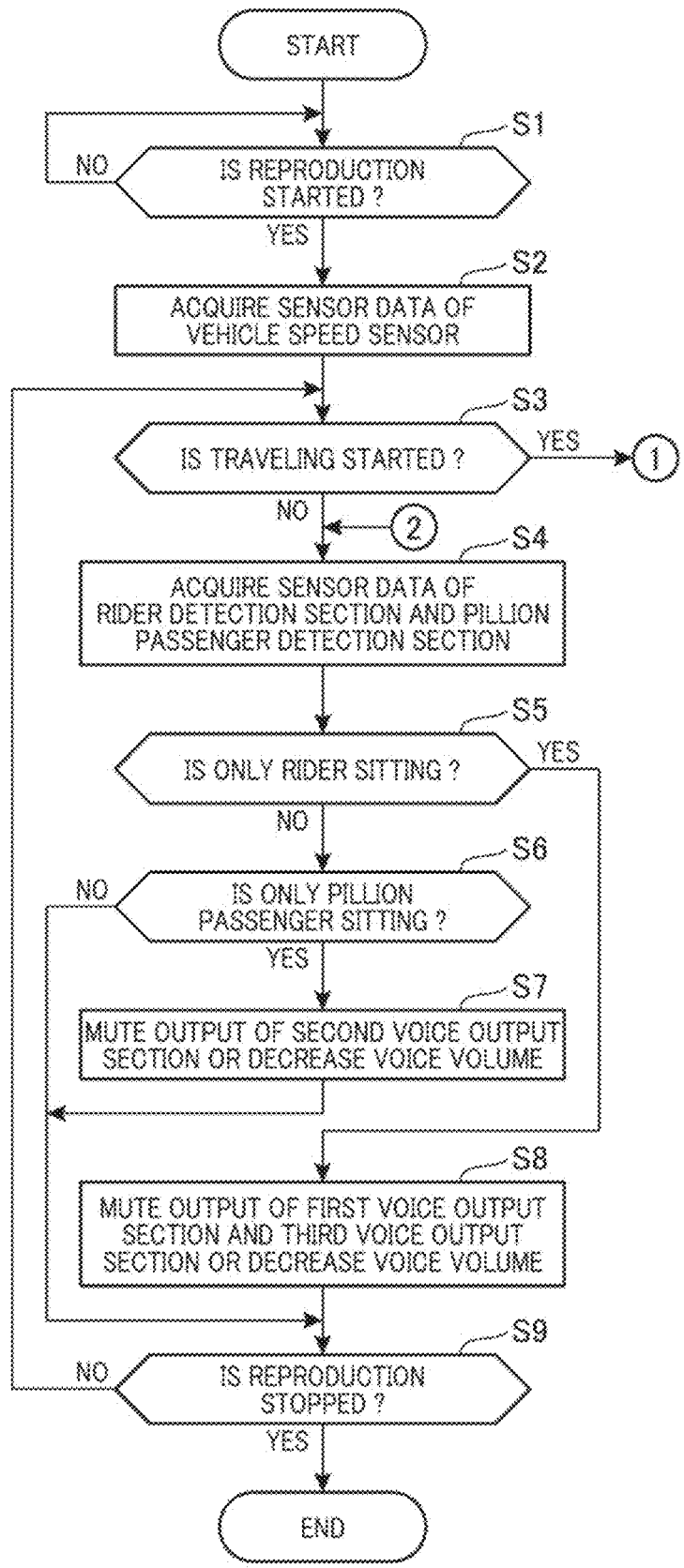
FIG. 11 is a flowchart which shows operation of the onboard device.
Figure 12:
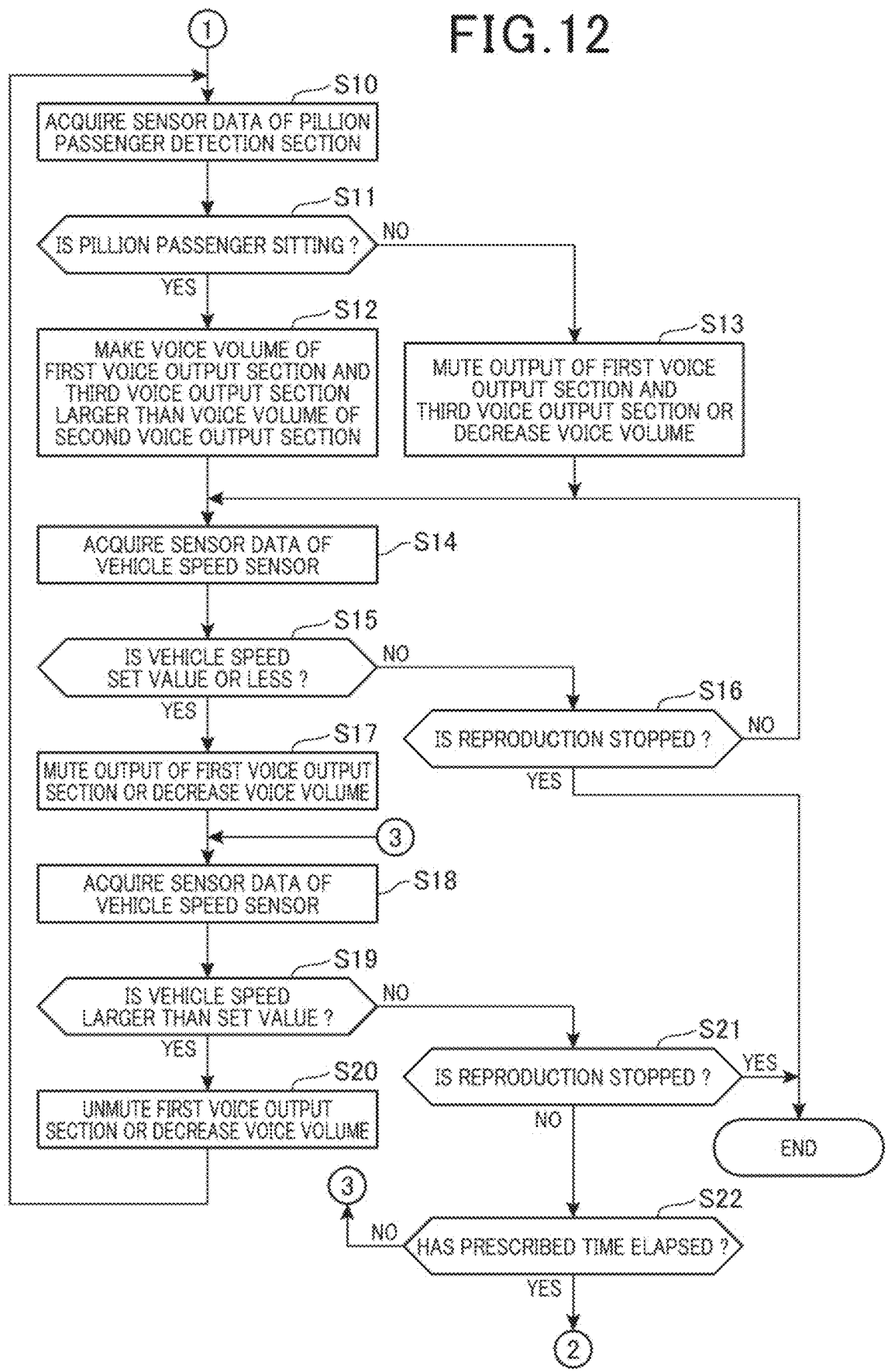
FIG. 12 is a flowchart which shows operation of the onboard device.

FIG. 11 and FIG. 12 are flowcharts which show the operation of the control section.

The operation of the control section 210 is described below referring to the flowcharts shown in FIG. 11 and FIG. 12.

First, the control section 210 determines whether or not manipulation to start reproduction of sound source data 225 has been received (Step S1). If manipulation to reproduce the sound source data 225 has not been received (Step S1/NO), the control section 210 waits for reception of manipulation to reproduce it.

If manipulation to reproduce the sound source data 225 has been received (Step S1/YES), the control section 210 acquires sensor data of the vehicle speed sensor 203 (Step S2). The control section 210 determines whether or not the vehicle 1 has started traveling, according to the acquired sensor data or the like (Step S3).

If the vehicle 1 has not started traveling (Step S3/NO), the control section 210 acquires sensor data of the rider detection section 201 and pillion passenger detection section 202 (Step S4). The control section 210 determines whether or not the rider U1 is sitting on the rider seat 51 and the pillion passenger U2 is sitting on the pillion passenger seat 53, according to the acquired sensor data.

If only the rider U1 is sitting on the vehicle 1 (Step S5/YES), the control section 210 mutes the output of the first voice output section 131 and third voice output section 135 or controls the signal amplifying section 110 so that the volume of the voice output by the first voice output section 131 and third voice output section 135 is smaller than the volume of the voice output from the second voice output section 133 (Step S8) and goes to Step S9 for determination. If only the pillion passenger U2 is sitting on the vehicle 1 (Step S5/NO and Step S6/YES), the control section 210 mutes the output of the second voice output section 133 or controls the signal amplifying section 110 so that the volume of the voice output by the second voice output section 133 is smaller than the volume of the voice output by the first voice output section 131 and third voice output section 135 (Step S7) and goes to Step S9 for determination.

If the judgement at Step S6 is a negative judgement, the control section 210 determines that the rider U1 and pillion passenger U2 are sitting on the vehicle 1 or the rider U1 and pillion passenger U2 are not sitting on the vehicle 1. In this case, the control section 210 goes to Step S9 for determination.

At Step S9, the control section 210 determines whether or not manipulation to stop reproduction of the sound source data 225 has been received (Step S9). If manipulation to stop reproduction of the sound source data 225 has been received (Step S9/YES), the control section 210 ends this processing flow. If manipulation to stop reproduction of the sound source data 225 has not been received (Step S9/NO), the control section 210 goes back to Step S3 to determine whether or not the vehicle 1 has started traveling.

If it is determined at Step S3 that the vehicle 1 has started traveling (Step S3/YES), the control section 210 acquires sensor data of the pillion passenger detection section 202 (Step S10). The control section 210 determines whether or not the pillion passenger U2 is sitting on the pillion passenger seat 53, according to the acquired sensor data (Step S11).

If the pillion passenger U2 is sitting on the pillion passenger seat 53 (Step S11/YES), the control section 210 controls the signal amplifying section 110 so that the volume of the voice output by the first voice output section 131 and third voice output section 135 is larger than the volume of the voice output by the second voice output section 133 (Step S12).

If the pillion passenger U2 is not sitting on the pillion passenger seat 53 (Step S11/NO), the control section 210 mutes the output of the first voice output section 131 and third voice output section 135 or controls the signal amplifying section 110 so that the volume of the voice output from the first voice output section 131 and third voice output section 135 is smaller than the volume of the voice output from the second voice output section 133 (Step S13).

Then, the control section 210 acquires sensor data of the vehicle speed sensor 203 (Step S14). The control section 210 determines whether or not the vehicle speed of the vehicle 1 has gone down to a set value or less to wait for the traffic light to change or the like (Step S15). If the vehicle speed of the vehicle 1 has not gone down to the set value or less (Step S15/NO), the control section 210 determines whether or not manipulation to stop reproduction of the sound source data 225 has been received (Step S16).

If manipulation to stop reproduction of the sound source data 225 has been received (Step S16/YES), the control section 210 ends this processing flow. If manipulation to stop reproduction of the sound source data 225 has not been received (Step S16/NO), the control section 210 goes back to Step 14 for determination and acquires sensor data of the vehicle speed sensor 203 again.

If the vehicle speed of the vehicle 1 has gone down to the set value or less (Step S15/YES), the control section 210 mutes the output of the first voice output section 131 or controls the signal amplifying section 110 so that the volume of the voice output by the first voice output section 131 is smaller than the volume of the voice output from the second voice output section 133 and third voice output section 135 (Step S17). Then, the control section 210 acquires sensor data of the vehicle speed sensor 203 (Step S18) and determines whether or not the vehicle speed of the vehicle 1 is larger than the set value (Step S19). If the vehicle speed is larger than the set value (Step S19/YES), the control section 210 unmutes the first voice output section 131 (Step S20). Alternatively, the control section 210 increases the volume of the voice output from the first voice output section 131 (Step S20). Then, the control section 210 goes back to Step S10 for determination.

If the vehicle speed is not larger than the set value (Step S19/NO), the control section 210 determines whether or not manipulation to stop reproduction of the sound source data 225 has been received (Step S21). If manipulation to stop reproduction of the sound source data 225 has been received (Step S16/YES), the control section 210 ends this processing flow. If manipulation to stop reproduction of the sound source data 225 has not been received (Step S21/NO), the control section 210 determines whether or not a prescribed time has elapsed after muting the output of the first voice output section 131 (Step S22).

If the prescribed time or more has elapsed after muting the output of the first voice output section 131 (Step S22/YES), the control section 210 determines that the vehicle 1 is not stopped temporarily to wait for the traffic light to change or the like, but the vehicle 1 is stopped because of having arrived at a rest area, destination or the like. In this case, the control section 210 goes back to Step S4 for determination and acquires sensor data from the rider detection section 201 and pillion passenger detection section 202.

If the prescribed time or more has not elapsed after muting the output of the first voice output section 131 (Step S22/NO), the control section 210 goes back to Step S18 and acquires sensor data of the vehicle speed sensor 203.

As explained above, according to this embodiment, the vehicle 1 includes the first voice output section 131, second voice output section 133, third voice output section 135, rider detection section 201, pillion passenger detection section 202, and control section 210. The first voice output section 131, second voice output section 133, and third voice output section 135 are arranged side by side in the width direction of the vehicle 1, the rider detection section 201 detects sitting of the rider U1 on the rider seat 51 of the vehicle 1, the pillion passenger detection section 202 detects sitting of the pillion passenger U2 on the pillion passenger seat 53, and the control section controls the volume of the voice output from the first voice output section 131, second voice output section 133, and third voice output section 135 according to the result of detection by the rider detection section 201 and pillion passenger detection section 202. If the rider detection section 201 and pillion passenger detection section 202 detect sitting on the rider seat 51 and pillion passenger seat 53, the control section 210 controls the first voice output section 131, second voice output section 133, and third voice output section 135 so that the volume of the voice output from the first voice output section 131 and third voice output section 135 is larger than the volume of the voice output from the second voice output section 133. The first voice output section 131 and third voice output section 135 are located at both ends in the width direction of the vehicle 1 and the second voice output section is located between the first voice output section 131 and third voice output section 135.

According to this feature, if sitting on the rider seat 51 and pillion passenger seat 53 is detected, the volume of the voice output from the first voice output section 131 and third voice output section 135 is controlled to be larger than the volume of the voice output from the second voice output section 133 and thus an adjustment can be made so that the volume of the voice heard by the rider U1 and that by the pillion passenger U2 behind the rider U1 are almost the same.

Furthermore, with the above feature, if the rider detection section 201 detects sitting on the rider seat 51 and the pillion passenger detection section 202 does not detect sitting on the pillion passenger seat 53, the control section 210 controls the first voice output section 131, second voice output section 133, and third voice output section 135 so that the volume of the voice output from the first voice output section 131 and third voice output section 135 is smaller than the volume of the voice output from the second voice output section 133 or the voice is not output from the first voice output section 131 and third voice output section 135.

According to this feature, power consumption can be reduced and the rider U1 can hear the voice with a sufficient volume.

Furthermore, if the pillion passenger detection section 202 detects sitting on the pillion passenger seat 53 and the rider detection section 201 does not detect sitting on the rider seat 51, the control section 210 controls the first voice output section 131, second voice output section 133, and third voice output section 135 so that the volume of the voice output from the second voice output section 133 is smaller than the volume of the voice output from the first voice output section 131 and third voice output section 135 or the voice is not output from the second voice output section 133.

According to this feature, power consumption can be reduced and the pillion passenger U2 can hear the voice with a sufficient volume.

Furthermore, the vehicle speed detection section which detects the vehicle speed of the vehicle 1 is provided and if the vehicle speed of the vehicle 1 is a set value or less, the control section 210 controls the first voice output section 131, second voice output section 133, and third voice output section 135 so that the volume of the voice output from the first voice output section 131 or third voice output section 135 is smaller than the volume of the voice output from other voice output sections, or the voice is not output from the first voice output section 131 or third voice output section 135. The first voice output section 131 or third voice output section 135 is located on an end side in the width direction of the road and nearer in distance to the end.

According to this feature, the voice output from the first voice output section 131 or third voice output section 135 can be prevented from being heard by a pedestrian.

Furthermore, the first voice output section 131 and third voice output section 135 are located outside of the vehicle width in the width direction of the vehicle 1.

According to this feature, the voice which reaches the pillion passenger U2 can be larger.

Furthermore, the first voice output section 131 and third voice output section 135 are located inside of the positions of the left mirror 55 and right mirror 57 installed on the vehicle 1 in the width direction of the vehicle 1.

According to this feature, it is possible to suppress the increase in the size of the vehicle 1 in the vehicle width direction due to the presence of the first voice output section 131, second voice output section 133, and third voice output section 135.

Furthermore, in the above structure, the first voice output section 131 and third voice output section 135 include a plurality of speakers.

According to this feature, the pillion passenger U2 can hear the voice with a sufficient volume.

The abovementioned embodiment is a preferred embodiment of the present invention. However, the gist of the present invention is not limited to the abovementioned embodiment and can be embodied in various other forms.

For example, in the above embodiment, the rider detection section 201 is provided to detect sitting of the rider U1 on the rider seat 51 and the pillion passenger detection section 202 is provided to detect sitting of the pillion passenger U2 on the pillion passenger seat 53. Alternatively, a switch may be provided on the manipulation portion 40 so that an input about sitting of the pillion passenger U2 on the pillion passenger seat 53 is made by manipulating the switch.

Figure 13:
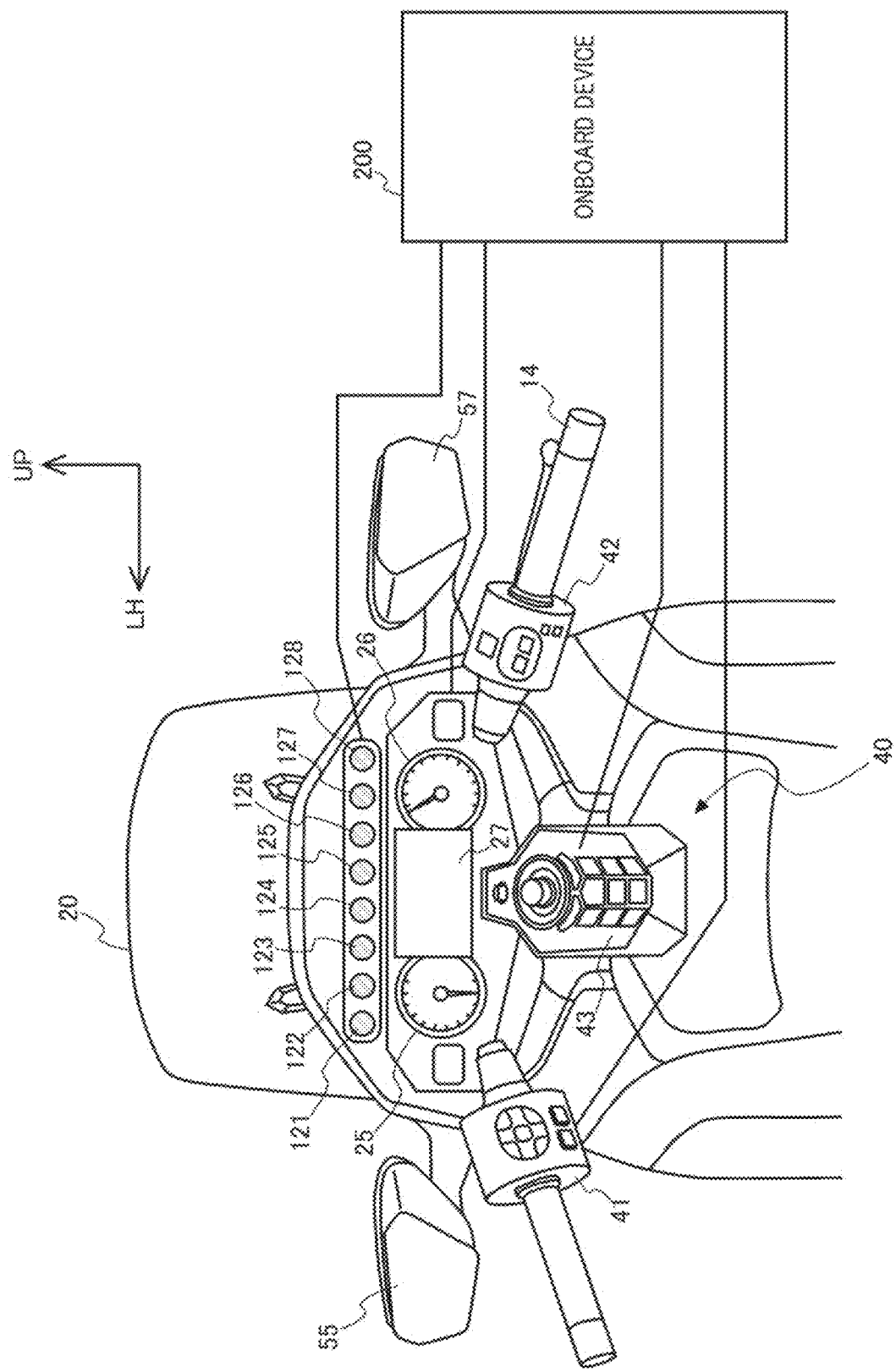
FIG. 13 is a view which shows another example of arrangement of a speaker array.

Furthermore, the arrangement of the speaker array 120 on the meter panel 21 is not limited to the arrangement shown in FIG. 3. FIG. 13 is a view which shows another example of arrangement of the speaker array 120. FIG. 13 shows an example that the speaker array 120 is located above the measuring instruments 25 and 26 of the meter panel 21 and the display 27. When the speaker array 120 is located above the measuring instruments 25 and 26 of the meter panel 21 and the display 27, it is nearer to the ears of the rider, offering the effect to prevent the voice from being attenuated by the steering handlebar or the like.

REFERENCE SIGNS LIST

1 . . . Vehicle
10 . . . Body frame
11 . . . Power unit
12 . . . Front fork
13 . . . Front wheel
14 . . . Steering handlebar
15 . . . Swing arm
16 . . . Rear wheel
17 . . . Seat
18 . . . Body cover
20 . . . Front screen
21 . . . Meter panel
25 . . . Measuring instrument
26 . . . Measuring instrument
40 . . . Manipulation portion
41 . . . Manipulation portion
42 . . . Manipulation portion
43 . . . Manipulation portion
51 . . . Rider seat
53 . . . Pillion passenger seat
55 . . . Left mirror
57 . . . Right mirror
100 . . . Controller board
101 . . . DSP
110 . . . Signal amplifying section
120 . . . Speaker array
121 . . . First speaker
122 . . . Second speaker
123 . . . Third speaker
124 . . . Fourth speaker
125 . . . Fifth speaker
126 . . . Sixth speaker
127 . . . Seventh speaker
128 . . . Eighth speaker
130 . . . Speaker
131 . . . First voice output section
133 . . . Second voice output section
135 . . . Third voice output section
200 . . . Onboard device
201 . . . Rider detection section (first detection section)
202 . . . Pillion passenger detection section (second detection section)
203 . . . Vehicle speed sensor
204 . . . Reproduction section
210 . . . Control section
220 . . . Storage
225 . . . Sound source data
230 . . . Processor
235 . . . Stereophonic control section
First AMP 111
Second AMP 112
Third AMP 113
Fourth AMP 114
Fifth AMP 115
Sixth AMP 116
Seventh AMP 117
Eighth AMP 118
U1 . . . Rider
U2 . . . Pillion passenger

The invention claimed is:

1. A vehicle comprising:
a first speaker, a second speaker, and a third speaker which are arranged side by side in a width direction of the vehicle;
a first sensor which detects sitting of a rider on a rider seat of the vehicle;
a second sensor which detects sitting of a pillion passenger on a pillion passenger seat provided behind the rider seat;
a vehicle speed sensor which detects a vehicle speed of the vehicle; and
a processor which controls a volume of voice according to a result of detection by the first sensor and the second sensor, the voice being output from the first speaker, the second speaker, and the third speaker,
wherein if the first sensor and the second sensor detect sitting on the rider seat and the pillion passenger seat, the processor controls the first speaker, the second speaker, and the third speaker to make the volume of the voice output from the first speaker and the third speaker larger than the volume of the voice output from the second speaker, the first speaker and the third speaker being located at both ends in the width direction of the vehicle and the second speaker being located between the first speaker and the third speaker, and
if the vehicle speed of the vehicle is a set value or less, the processor controls the first speaker, the second speaker, and the third speaker to make the volume of the voice output from the first speaker or the third speaker smaller than the volume of the voice output from other speakers or prevent the voice from being output from the first speaker or the third speaker, the first speaker or the third speaker being located on an end side in a width direction of a road and nearer in distance to an end.

2. The vehicle according to claim 1,
wherein if the first sensor detects sitting on the rider seat and the second sensor does not detect sitting on the pillion passenger seat, the processor controls the first speaker, the second speaker, and the third speaker to make the volume of the voice output from the first speaker and the third speaker smaller than the volume of the voice output from the second speaker or prevent the voice from being output from the first speaker and the third speaker.

3. The vehicle according to claim 1,
wherein if the second sensor detects sitting on the pillion passenger seat and the first sensor does not detect sitting on the rider seat, the processor controls the first speaker, the second speaker, and the third speaker to make the volume of the voice output from the second speaker smaller than the volume of the voice output from the first speaker and the third speaker or prevent the voice from being output from the second speaker.

4. The vehicle according to claim 1, wherein the first speaker and the third speaker are located outside of a vehicle width in the width direction of the vehicle.

5. The vehicle according to claim 1, wherein the first speaker and the third speaker are located inside of positions of mirrors installed on the vehicle in the width direction of the vehicle.

6. The vehicle according to claim 1, wherein the first speaker and the third speaker include a plurality of speakers.

7. A vehicle comprising:
a first speaker, a second speaker, and a third speaker which are arranged side by side in a width direction of the vehicle;
a first sensor which detects sitting of a rider on a rider seat of the vehicle;
a second sensor which detects sitting of a pillion passenger on a pillion passenger seat provided behind the rider seat; and
a processor which controls a volume of voice according to a result of detection by the first sensor and the second sensor, the voice being output from the first speaker, the second speaker, and the third speaker,
wherein if the first sensor and the second sensor detect sitting on the rider seat and the pillion passenger seat, the processor controls the first speaker, the second speaker, and the third speaker to make the volume of the voice output from the first speaker and the third speaker larger than the volume of the voice output from the second speaker, the first speaker and the third speaker being located at both ends in the width direction of the vehicle and the second speaker being located between the first speaker and the third speaker,
the first speaker and the third speaker are located outside of a vehicle width in the width direction of the vehicle.

* * * * *